US012811542B2

(12) United States Patent
Tammu et al.

(10) Patent No.: US 12,811,542 B2
(45) Date of Patent: *Nov. 24, 2026

(54) BHA TUBE RAIL

(71) Applicant: Nextpower LLC, Fremont, CA (US)

(72) Inventors: Sri Rama Krishna Tammu, Andhra Pradesh (IN); Bhanu Rekha Bandhakavi, Hyderabad (IN); Ricardo Delgado-Nanez, San Jose, CA (US)

(73) Assignee: NEXTPOWER LLC, Fremont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/056,550

(22) Filed: Feb. 18, 2025

(65) Prior Publication Data

US 2025/0192718 A1 Jun. 12, 2025

Related U.S. Application Data

(63) Continuation of application No. 18/363,977, filed on Aug. 2, 2023, now Pat. No. 12,231,078.

(51) Int. Cl.
*H02S 20/32* (2014.01)

(52) U.S. Cl.
CPC .................................... *H02S 20/32* (2014.12)

(58) Field of Classification Search
CPC .. H02S 20/32; H02S 30/00; F24S 2025/6003; F24S 25/12; F24S 30/425
See application file for complete search history.

(56) References Cited

U.S. PATENT DOCUMENTS

| | | | | |
|---|---|---|---|---|
| 2014/0270930 A1* | 9/2014 | Grushkowitz | F16D 1/033 | 403/337 |
| 2015/0000721 A1* | 1/2015 | Au | F16C 25/02 | 136/246 |
| 2015/0001356 A1* | 1/2015 | Au | F24S 30/425 | 248/185.1 |
| 2015/0059826 A1* | 3/2015 | Reed | F24S 25/70 | 136/246 |
| 2015/0187975 A1* | 7/2015 | Wares | F24S 25/634 | 136/246 |
| 2017/0279405 A1* | 9/2017 | Wares | H02S 30/10 | |
| 2019/0296688 A1* | 9/2019 | Kresse | H02S 20/10 | |
| 2020/0052643 A1* | 2/2020 | Ballentine | F16M 11/10 | |
| 2021/0080980 A1* | 3/2021 | Kesler | H02S 20/32 | |
| 2023/0208348 A1* | 6/2023 | Ballentine | H02S 20/32 | 136/251 |

* cited by examiner

*Primary Examiner* — Golam Mowla
(74) *Attorney, Agent, or Firm* — Fredrikson & Byron, P.A.

(57) ABSTRACT

A mounting assembly, for fixing a solar module to a torque tube, includes a rail and a saddle. The rail includes first and second sides, first and second solar module mounting apertures at the first side, and first and second saddle mounting apertures at the second side. The saddle includes a saddle body and first and second saddle arms each extending from the saddle body. The first saddle arm includes a first mounting aperture and the second saddle arm includes a second mounting aperture. The first saddle mounting aperture and the first mounting aperture are configured to receive a first fastening member to form a first connection between the rail and the saddle. And the second saddle mounting aperture and the second mounting aperture are configured to receive a second fastening member to form a second connection between the rail and the saddle.

19 Claims, 7 Drawing Sheets

BHA TUBE RAIL

PRIORITY CLAIM

This application is a continuation of U.S. patent application Ser. No. 18/363,977, filed Aug. 2, 2023, which is incorporated by reference in its entirety.

TECHNICAL FIELD

This disclosure relates generally to device, system, and method embodiments for coupling a solar module to a support member. Embodiments disclosed herein can include a saddle and rail for mounting at least one solar module at a support member.

BACKGROUND

Solar panels can convert sunlight into energy. As an example, solar thermal panels often convert electromagnetic radiation from the sun into thermal energy for heating homes, running certain industrial processes, or driving high grade turbines to generate electricity. As another example, solar photovoltaic panels convert sunlight directly into electricity for a variety of applications. Solar panels are generally composed of an array of solar cells, which are interconnected to each other. The cells are often arranged in series and/or parallel groups of cells in series. Accordingly, solar panels have great potential to benefit our nation, security, and human users. They can even diversify our energy requirements and reduce the world's dependence on oil and other potentially detrimental sources of energy.

Although solar panels have been used successfully for certain applications, there are still limitations. Often, solar panels can be difficult and time-consuming to assemble in the field. Cumbersome frames, attachment members, and assembly techniques are often required. And, yet, such cumbersome frames, attachment members, and assembly techniques can result in undesirably, highly/locally concentrated attachment forces on the solar module.

SUMMARY

This disclosure in general describes embodiments of devices, systems, and methods for coupling one or more solar modules to a support structure. Such embodiments disclosed herein can be configured to facilitate relatively quick and efficient solar module system assembly in the field. And, yet, such embodiments can additionally provide advantageous free surface area (e.g., at a surface of the rail) of a relatively larger extent to provide increased structural support to the solar module, particularly as the solar module experiences various dynamic forces in the field. This can help to provide a more structurally robust, longer useful life for the solar module system leveraging such mounting assemblies disclosed herein.

One embodiment includes a mounting assembly for a solar module. This embodiment of the mounting assembly includes a rail and a saddle. The rail includes a first side and a second side, a first solar module mounting aperture at the first side, a second solar module mounting aperture at the first side, a first saddle mounting aperture at the second side, and a second saddle mounting aperture at the second side. The saddle includes a saddle body, a first saddle arm extending from the saddle body, and a second saddle arm extending from the saddle body. The first saddle arm includes a first mounting aperture and the second saddle arm includes a second mounting aperture. The saddle body includes a first torque tube mounting aperture and a second torque tube mounting aperture. The first saddle mounting aperture and the first mounting aperture are configured to receive a first fastening member to form, at least in part, a first connection between the rail and the saddle. And the second saddle mounting aperture and the second mounting aperture are configured to receive a second fastening member to form, at least in part, a second connection between the rail and the saddle.

According to a further embodiment of this assembly, the first mounting aperture and the first torque tube mounting aperture are at a first side of the saddle, and the second mounting aperture and the second torque tube mounting aperture are at a second, opposite side of the saddle. For example, the first mounting aperture and the first torque tube mounting aperture can be offset along a width of the saddle at the first side of the saddle, and the second mounting aperture and the second torque tube mounting aperture can be offset along the width of the saddle at the second side of the saddle. In such an example, for instance, the first side of the rail can be a top side of the rail and the second side of the rail can be a bottom side of the rail such that the first side of the rail is opposite the second side of the rail. In another example, the first mounting aperture and the first torque tube mounting aperture can be offset along a height of the saddle at the first side of the saddle, and the second mounting aperture and the second torque tube mounting aperture can be offset along the height of the saddle at the second side of the saddle. In such an example, the first side of the rail can be a top side of the rail and the second side of the rail can be a transverse side of the rail such that the first side of the rail is adjacent the second side of the rail.

According to a further embodiment of this assembly, the assembly can further include a u-bolt that is configured to wrap around at least a portion of a torque tube and connect to the first torque tube mounting aperture at the saddle body and the second torque tube mounting aperture at the saddle body. For example, when the u-bolt is connected to the saddle, the u-bolt and the saddle can form an enclosure around an entire perimeter of the torque tube.

According to a further embodiment of this assembly, the first side of the rail further includes a solar module support surface. For example, the solar module support surface can be defined between the first solar module mounting aperture and the second solar module mounting aperture. In such an example, the solar module support surface can be configured to directly contact and support the solar module along an entire length of the solar module support surface defined between the first solar module mounting aperture and the second solar module mounting aperture. In one such instance, this can include the entire length of the solar module support surface configured to directly contact and support the solar module, and defined between the first solar module mounting aperture and the second solar module mounting aperture, ranging from 100 to 3000 mm, such as ranging from 500 to 1000 mm, 700 to 900 mm, or such as from 750 to 850 mm.

According to a further embodiment of this assembly, the assembly can further include a bearing housing assembly adjacent to the rail and the saddle, and a pin extending between the bearing housing assembly and the saddle. For example, the saddle can include a pin receiving aperture at the saddle body between the first saddle arm and the second saddle arm, and the pin receiving aperture can be configured to receive a first end portion of the pin opposite a second end portion of the pin that is at the bearing housing assembly. In such example, for instance, the first mounting aperture and the first torque tube mounting aperture can be at a first side of the saddle, the second mounting aperture and the second torque tube mounting aperture can be at a second, opposite side of the saddle, and the pin receiving aperture can be at a central portion of the saddle body between the first side of the saddle and the second side of the saddle.

Another embodiment include a solar module tracking apparatus. This apparatus embodiment includes a solar module comprising a plurality of photovoltaic cells, a torque tube that is configured to rotatably move the solar module, and a mounting assembly connecting the solar module to the torque tube. The mounting assembly includes a rail and a saddle. The rail includes a first side and a second side, a first solar module mounting aperture at the first side, a second solar module mounting aperture at the first side, a first saddle mounting aperture at the second side, and a second saddle mounting aperture at the second side. The saddle includes a saddle body, a first saddle arm extending from the saddle body, and a second saddle arm extending from the saddle body. The first saddle arm includes a first mounting aperture, and the second saddle arm includes a second mounting aperture. The saddle body includes a first torque tube mounting aperture and a second torque tube mounting aperture. The first saddle mounting aperture and the first mounting aperture receive a first fastening member to form, at least in part, a first connection between the rail and the saddle, and the second saddle mounting aperture and the second mounting aperture receive a second fastening member to form, at least in part, a second connection between the rail and the saddle.

According to a further embodiment of this apparatus, the apparatus can further include a u-bolt connected to the first torque tube mounting aperture at the saddle body and to the second torque tube mounting aperture at the saddle body. The u-bolt can wrap around at least a portion of the torque tube such that the u-bolt and the saddle form an enclosure around an entire perimeter of the torque tube. For example, the first side of the rail can further include a solar module support surface. This solar module support surface can be defined between the first solar module mounting aperture and the second solar module mounting aperture. This solar module support surface can be configured to directly contact and support the solar module along an entire length of the solar module support surface defined between the first solar module mounting aperture and the second solar module mounting aperture. The entire length of the solar module support surface can be configured to directly contact and support the solar module, and defined between the first solar module mounting aperture and the second solar module mounting aperture, can range from 500 to 1000 mm.

The details of one or more examples are set forth in the accompanying drawings and the description below. Other features, objects, and advantages will be apparent from the description and drawings, and from the claims.

BRIEF DESCRIPTION OF DRAWINGS

The following drawings are illustrative of particular examples of the present invention and therefore do not limit the scope of the invention. The drawings are intended for use in conjunction with the explanations in the following detailed description wherein like reference characters denote like elements. Examples of the present invention will hereinafter be described in conjunction with the appended drawings.

DETAILED DESCRIPTION

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Embodiments disclosed herein include various devices, systems, and methods configured for mounting one or more solar modules at a support structure in an improved manner. Certain such embodiments disclosed herein can be configured to facilitate relatively quick and efficient solar module system assembly in the field while also helping to better distribute forces experienced in the field during the useful life of the solar module to thereby provide a more structurally robust, longer useful life for the system. These include, as disclosed herein, certain embodiments that include a relatively elongated solar module support surface at a rail component so as to better distribute forces (e.g., loading forces, attachment forces, and/or dynamic forces experiences in the field) along that elongated solar module support surface at the rail.

Figure 1:
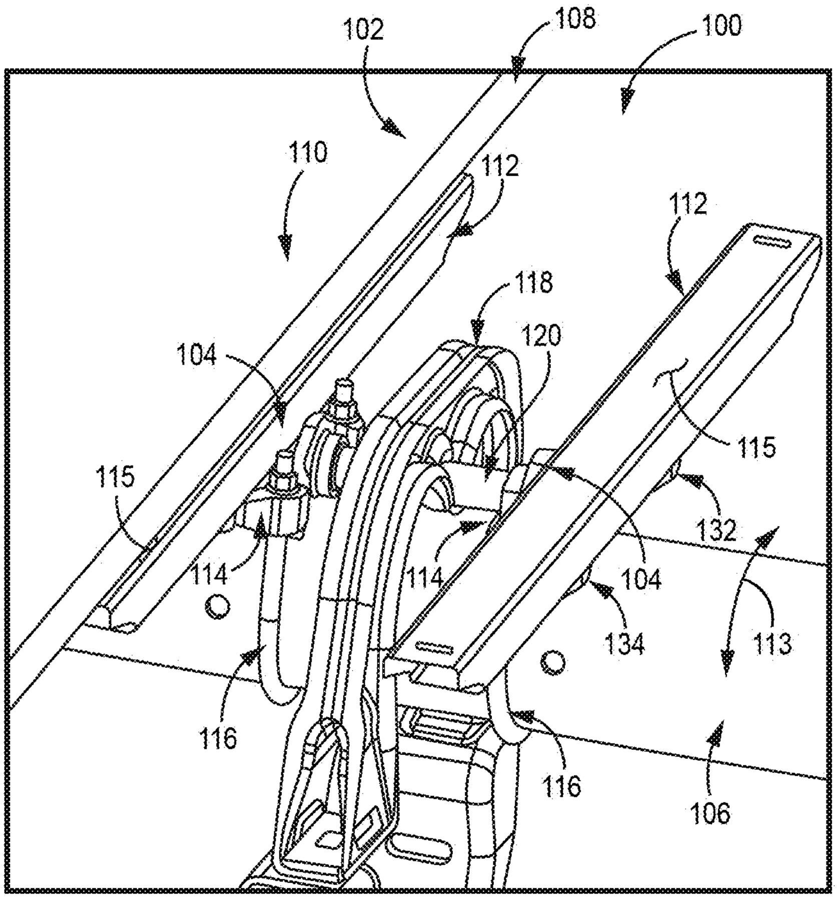
FIG. 1 is a perspective view of an embodiment of a solar module tracking apparatus.

FIG. 1 is a perspective view of an embodiment of a solar module tracking apparatus 100. The solar module tracking apparatus 100 can include one or more solar modules 102, one or more mounting assemblies 104, and a torque tube 106. The solar module 102 can include a frame 108 and a plurality of photovoltaic cells 110. The frame 108 can bound the photovoltaic cells 110 and form a perimeter of the solar module 102 (e.g., with the frame 108 being made of a different material than that of the photovoltaics cells 110). Each mounting assembly 104 can connect at least one solar module 102 to the torque tube 106, and the torque tube 106 can be configured to rotatably move one or more such solar modules 102. The torque tube 106 can be actuated by a controller to cause the torque tube 106 to move, such as rotate about a longitudinal axis of the torque tube 106 in directions 113. As such, with one or more solar modules 102 coupled to the torque tube 106 via one or more mounting assemblies 104, as the torque tube 106 is moved the one or more solar modules 102 coupled to the torque tube 106 are also moved. This can facilitate more optimized solar power generation at the photovoltaic cells 110 by adjusting the angle of the one or more solar modules 102 at one or more times (e.g., at times during a given day) to help "track" the sun as it moves over that period of time and, thereby, maintain more optimized positioning of the photovoltaic cells 110 relative to the angle of sunlight irradiation at that given time of the day.

The illustrated embodiment of the solar module tracking apparatus 100 shows two mounting assemblies 104, with one such mounting assembly 104 configured to couple one solar module 102 to the torque tube 106 and the other such mounting assembly 104 configured to couple another solar module (not shown) to the torque tube 106. As one example, each solar module 102 can be coupled to the torque tube at each of its two opposite longitudinal sides by a dedicated mounting assembly 104. In such an example, a given solar module 102 can be supported and coupled to the torque tube 106 at one longitudinal side portion by one mounting assembly 104 and supported and coupled to the torque tube 106 at the other, opposite longitudinal side portion by another mounting assembly 104.

The mounting assembly 104 can include a rail 112 and a saddle 114, and the rail 112 and the saddle 114 can be configured to connect together to form, at least in part, the mounting assembly 104. The mounting assembly 104 can include thereat at least one solar module support surface 115 (e.g., planar solar module support surface 115) that is configured to support thereat at least a portion of at least one solar module 102. The illustrated embodiment of the mounting assembly 104 includes the solar module mounting surface 115 at the rail 112. For example, as illustrated for the embodiment shown at FIG. 1, the solar module mounting surface 115 at the rail 112 can be configured to directly contact and support the solar module 102 along an entire length of the solar module support surface 115.

The rail 112 as shown for the illustrated embodiment is of a rectangular cross-sectional shape. Though in other embodiments other cross-sectional rail shapes can be used, such as square, hexagonal, circular, etc. Also as shown for the illustrated embodiment, the rail 112 is made up of four walls (upper horizontal wall, lower horizontal wall, first side vertical wall, and second, opposite side vertical wall) that define the rectangular cross-sectional shape, or in other embodiments that define the given cross-sectional shape of the rail 112. Though in other embodiments the rail 112 can be more planar in nature with a single horizontal wall.

The mounting assembly 104 can, in some embodiments, further include a u-bolt 116. With the rail 112 coupled to the saddle 114, the u-bolt 116 can be configured to couple the saddle 114 to the torque tube 106. To couple to the torque tube 106, for example, the u-bolt 116 can wrap around at least a portion of the torque tube 106 such that the u-bolt 116 and the saddle 114 form an enclosure around an entire perimeter of the torque tube 106.

In certain further embodiments, such as that illustrated at FIG. 1, the mounting assembly 104 can additionally include a bearing housing assembly 118. The bearing housing assembly 118 can include one more bearing elements thereat configured to support the torque tube 106. This can include the bearing housing assembly 118 having one more rotatable bearing elements thereat configured to rotatably support the torque tube 106 via the bearing housing assembly 118. The bearing housing assembly 118 can, for instance, be positioned adjacent to the rail 112 and the saddle 114. In some examples, the mounting assembly 104 can be connected to the bearing housing assembly 118. For instance, as shown for the illustrated embodiment at FIG. 1, a pin 120 can be included with the mounting assembly 104, and the pin 120 can extend between the bearing housing assembly 118 and the saddle 114. As such, the pin 120 can connect the saddle 114 to the bearing housing assembly 118. The pin 120 can be rotatable supported at each of the saddle 114 and the bearing housing assembly 118 such that the pin 120, along with the mounting assembly 104 and solar module 102, can rotate as a result of rotation of the torque tube 106 in the direction 113. The illustrated embodiment at FIG. 1 shows the pin 120 rotatably supporting two mounting assemblies 104 at opposite sides of the bearing housing assembly 118.

Figure 2:
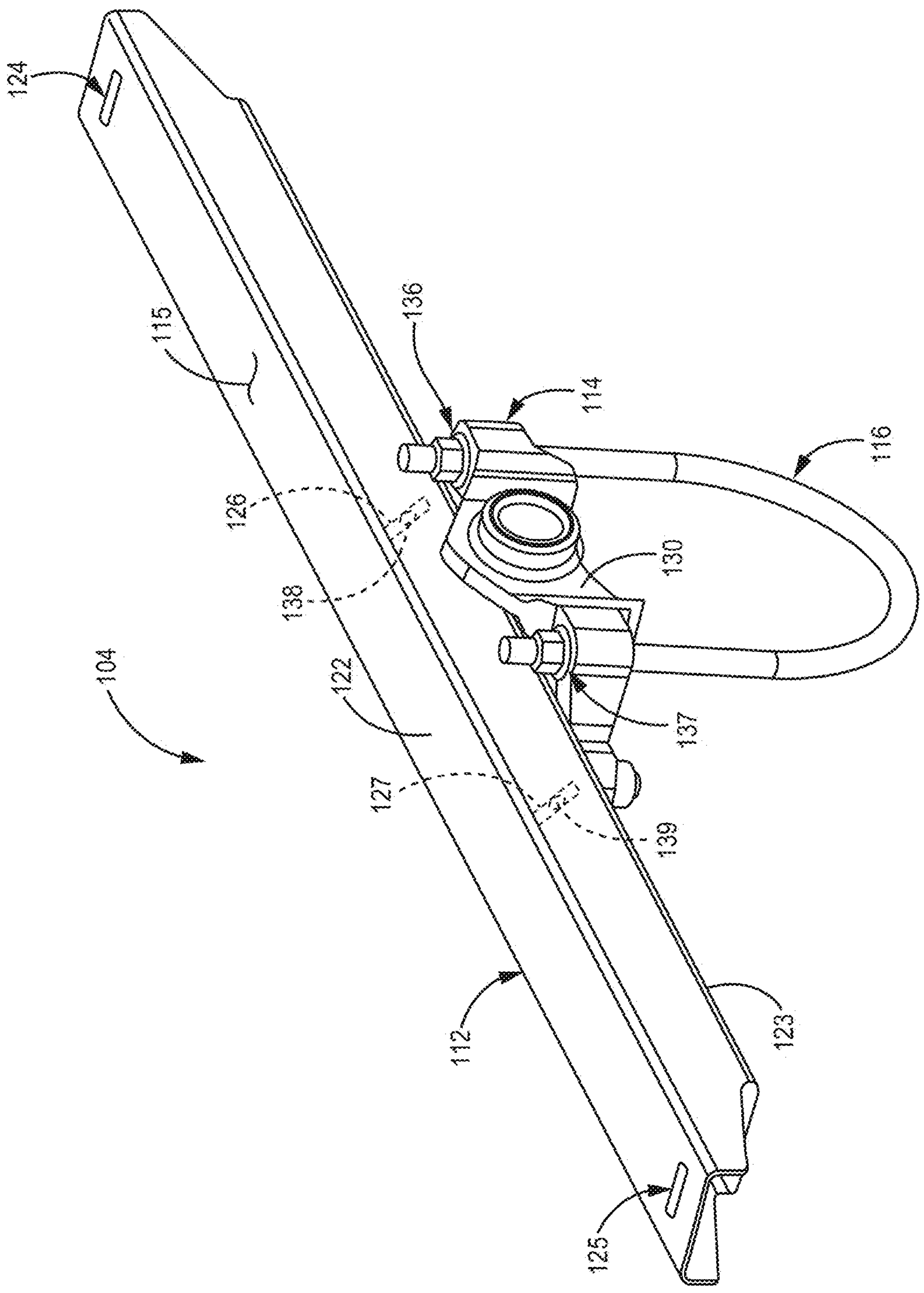
FIG. 2 is a perspective view of an embodiment of a mounting assembly of the solar module tracking apparatus of FIG. 1.
Figure 3:
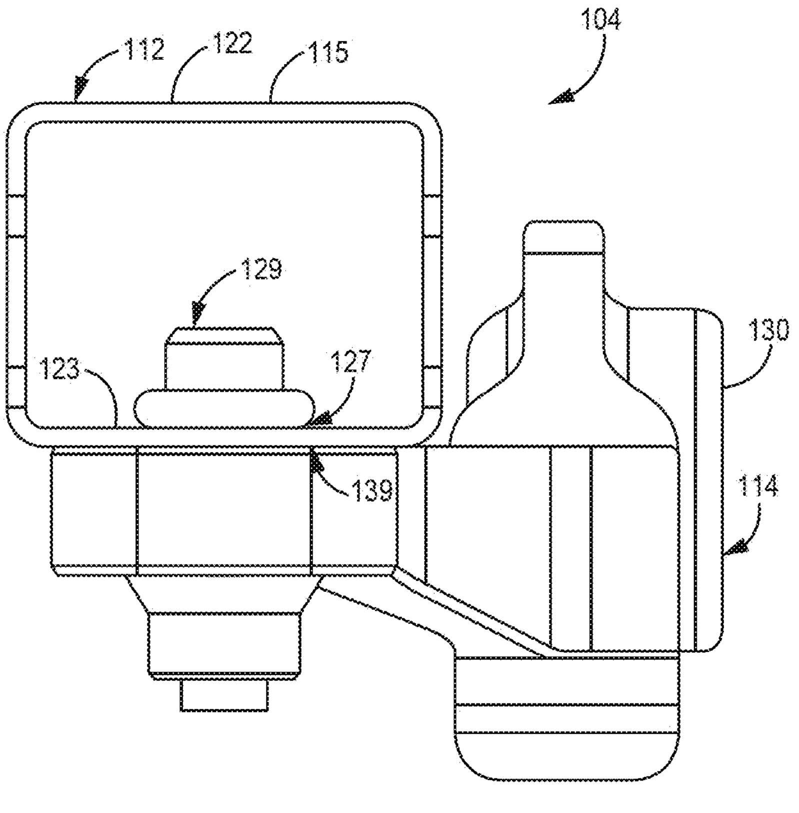
FIG. 3 is a side elevational view of the mounting assembly of FIG. 2.
Figure 4:
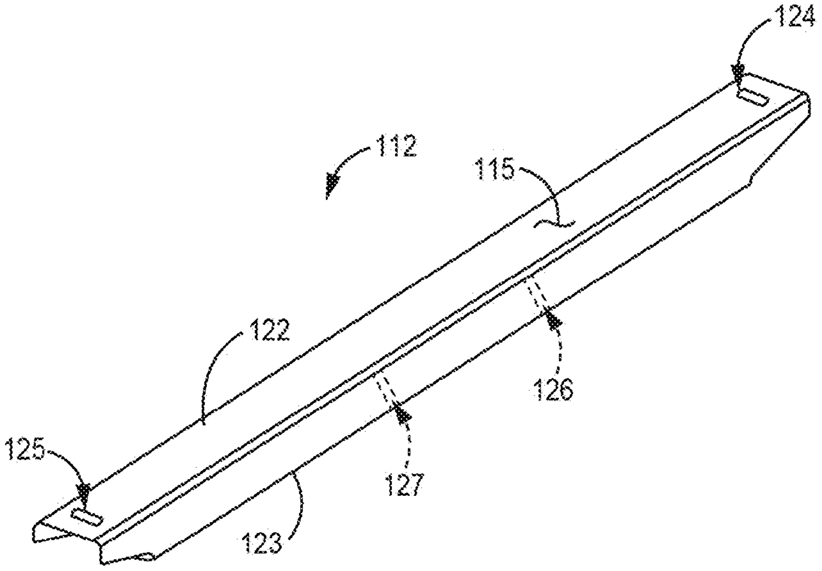
FIG. 4 is a perspective view of an embodiment of a rail of the mounting assembly of FIG. 2.
Figure 5:
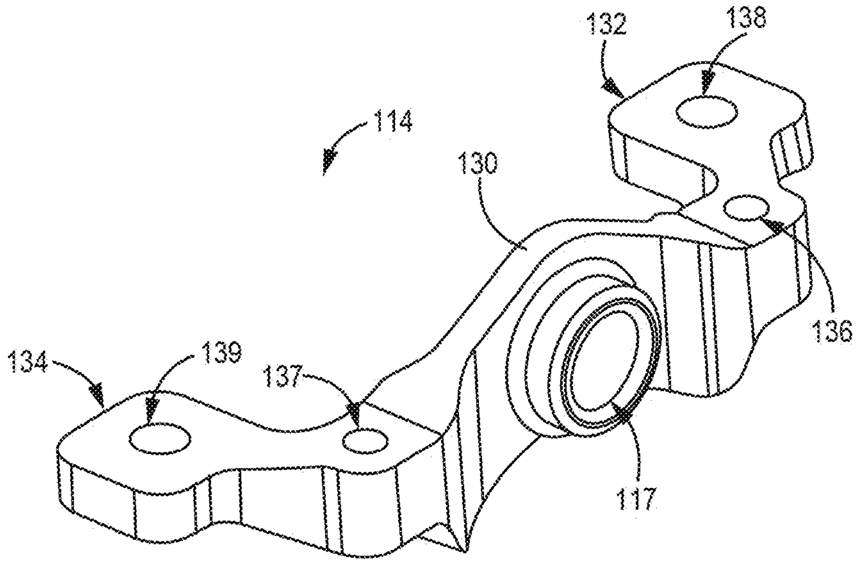
FIG. 5 is a perspective view of an embodiment of a saddle of the mounting assembly of FIG. 2.

Various details of the mounting assembly 104 will now be described. FIGS. 2-5 illustrate various exemplary details of the mounting assembly 104. FIGS. 2 and 3 show the mounting assembly 104 of FIG. 1 in isolation. FIG. 2 is a perspective view of the mounting assembly 104, and FIG. 3 is a side elevational view of the mounting assembly 104. FIGS. 4 and 5 show mounting assembly 104 components in isolation. FIG. 4 is a perspective view of the rail 112 of the mounting assembly 104, and FIG. 5 is a perspective view of the saddle 114 of the mounting assembly 104.

The rail 112 can include a first side 122 and a second side 123. The rail 112 can further include a first solar module mounting aperture 124 and a second solar module mounting aperture 125. The first and second solar module mounting apertures 124, 125 can be at a same side of the rail 112. For instance, both the first solar module mounting aperture 124 and the second solar module mounting aperture 125 can be at the first side 122. The rail 112 can additionally include a first saddle mounting aperture 126 and a second saddle mounting aperture 127. The first and second saddle mounting apertures 126, 127 can be at a same side of the rail 112. For instance, both the first saddle mounting aperture 126 and the second saddle mounting aperture 127 can be at the second side 123. For the illustrated embodiment at FIGS. 1-4, the rail 112 can include the first side 122 opposite the second side 123 and, thus, the first and second solar module mounting apertures 124, 125 at the first side 122 can be opposite the first and second saddle mounting apertures 126, 127 at the second side 123.

The saddle 114 can include a saddle body 130, a first saddle arm 132, and a second saddle arm 134. The saddle body can include a first torque tube mounting aperture 136 and a second torque tube mounting aperture 137. The first saddle arm 132 can extend from the saddle body 130, and the second saddle arm 134 can extend from the saddle body 130. For instance, for the illustrated embodiment, the first saddle arm 132 and the second saddle arm 134 extend out from the saddle body 130 in opposite directions. The first saddle arm 132 can include a first mounting aperture 138 and the second saddle arm 134 can include a second mounting aperture 139.

As best shown at FIG. 5, for the illustrated embodiment, the first mounting aperture 138 and the first torque tube mounting aperture 136 can be at a first side of the saddle 114, and the second mounting aperture 139 and the second torque tube mounting aperture 137 can be at a second, opposite side of the saddle 114. For instance, the first mounting aperture 138 and the first torque tube mounting aperture 136 can be at a first side of the saddle 114 that is at one side of a pin receiving aperture 117 at the saddle body 130, and the second mounting aperture 139 and the second torque tube mounting aperture 137 can be at a second side of the saddle 114 that is at another, opposite side of the pin receiving aperture 117 at the saddle body 130. As also shown for the illustrated embodiment, the first mounting aperture 138 and the first torque tube mounting aperture 136 can be offset along a width of the saddle 114 at the first side of the saddle, and the second mounting aperture 139 and the second torque tube mounting aperture 137 can be offset along the width of the saddle 114 at the second side of the saddle. Accordingly, the first torque tube mounting aperture 136 and the second torque tube mounting aperture 137 can be aligned on a first axis running along a length of the saddle 114, and the first mounting aperture 138 and the second mounting aperture 139 can be aligned along a second axis running along the length of the saddle, with the first and second axes running parallel to one another such that the first and second torque tube mounting apertures 136, 137 can be spaced apart from the first and second mounting apertures 138, 139 along a width of the saddle 114. In such an embodiment, the first side 122 of the rail 112 can be a top side of the rail 112 and the second side 123 of the rail 112 can be a bottom side of the rail 112 such that the first side 122 of the rail 112 is opposite the second side 123 of the rail 112.

The saddle mounting apertures 126, 127 at the rail 112 and the mounting apertures 138, 139 at the saddle 114 can be configured to facilitate connecting the rail 112 and the saddle 114. For example, the first saddle mounting aperture 126 and the first mounting aperture 138 can be configured to receive a first fastening member to form, at least in part, a first connection between the rail 112 and the saddle 114. And the second saddle mounting aperture 127 and the second mounting aperture 139 can be configured to receive a second fastening member 129 to form, at least in part, a second connection between the rail 112 and the saddle 114.

As noted, the saddle 114 can include the pin receiving aperture 117 at the saddle body 130. In particular, the pin receiving aperture 117 can be between the first saddle arm 132 and the second saddle arm 134, and the pin receiving aperture 117 can be configured to receive a first end portion of the pin 120 opposite a second end portion of the pin 120 that is at the bearing housing assembly 118. As previously noted, the first mounting aperture 138 and the first torque tube mounting aperture 136 can be at a first side of the saddle 114, and the second mounting aperture 139 and the second torque tube mounting aperture 137 can be at a second, opposite side of the saddle 114. As such, the pin receiving aperture 117 can then be at a central portion of the saddle body 130 between the first side of the saddle 114, having the first mounting aperture 138 and the first torque tube mounting aperture 136, and the second side of the saddle 114, having the second mounting aperture 139 and the second torque tube mounting aperture 137.

The mounting assembly 104 can, as previously noted, additionally include the u-bolt 116. The u-bolt 116 can be configured to wrap around at least a portion of the torque tube 106 and connect to the first torque tube mounting aperture 136 at the saddle body 130 and the second torque tube mounting aperture 137 at the saddle body 130. A first fastening member can be used to secure the u-bolt 116 in place at the first torque tube mounting aperture 136 and a second fastening member can be sued to secure the u-bolt 116 in place at the second torque tube mounting aperture 137. When the u-bolt 116 is connected to the saddle 114 as such, the u-bolt 116 and the saddle 114 can form an enclosure around an entire perimeter of the torque tube 106 (e.g., as shown at FIG. 1).

The mounting assembly 104 can provide the solar module mounting surface 115 (e.g., at the rail 112) in a way that facilitates improved load distribution along the relatively elongated solar module mounting surface 115. For example, as shown, for instance, at FIGS. 1 and 2, the first side of the rail 122 includes the solar module support surface 115. For example, the solar module support surface 115 can be defined between the first solar module mounting aperture 124 and the second solar module mounting aperture 125. The solar module support surface 115 can, in some embodiments, be configured to directly contact and support the solar module 102 along an entire length of the solar module support surface 115 defined between the first solar module mounting aperture 124 and the second solar module mounting aperture 125. For instance, the entire length of the solar module support surface 115 configured to directly contact and support the solar module 102, and defined between the first solar module mounting aperture 124 and the second solar module mounting aperture 125, can range from 100 to 3000 mm, such as ranging from 500 to 1000 mm, 700 to 900 mm, or such as from 750 to 850 mm. Such solar module support surface 115 can be relatively elongated as compared to conventional mounting apparatus solar module support surfaces and, as such, this relatively longer solar module support surface 115 as disclosed herein can provide improved load distribution and increased structural stability to the solar module 102 mounted thereat.

Figure 6:
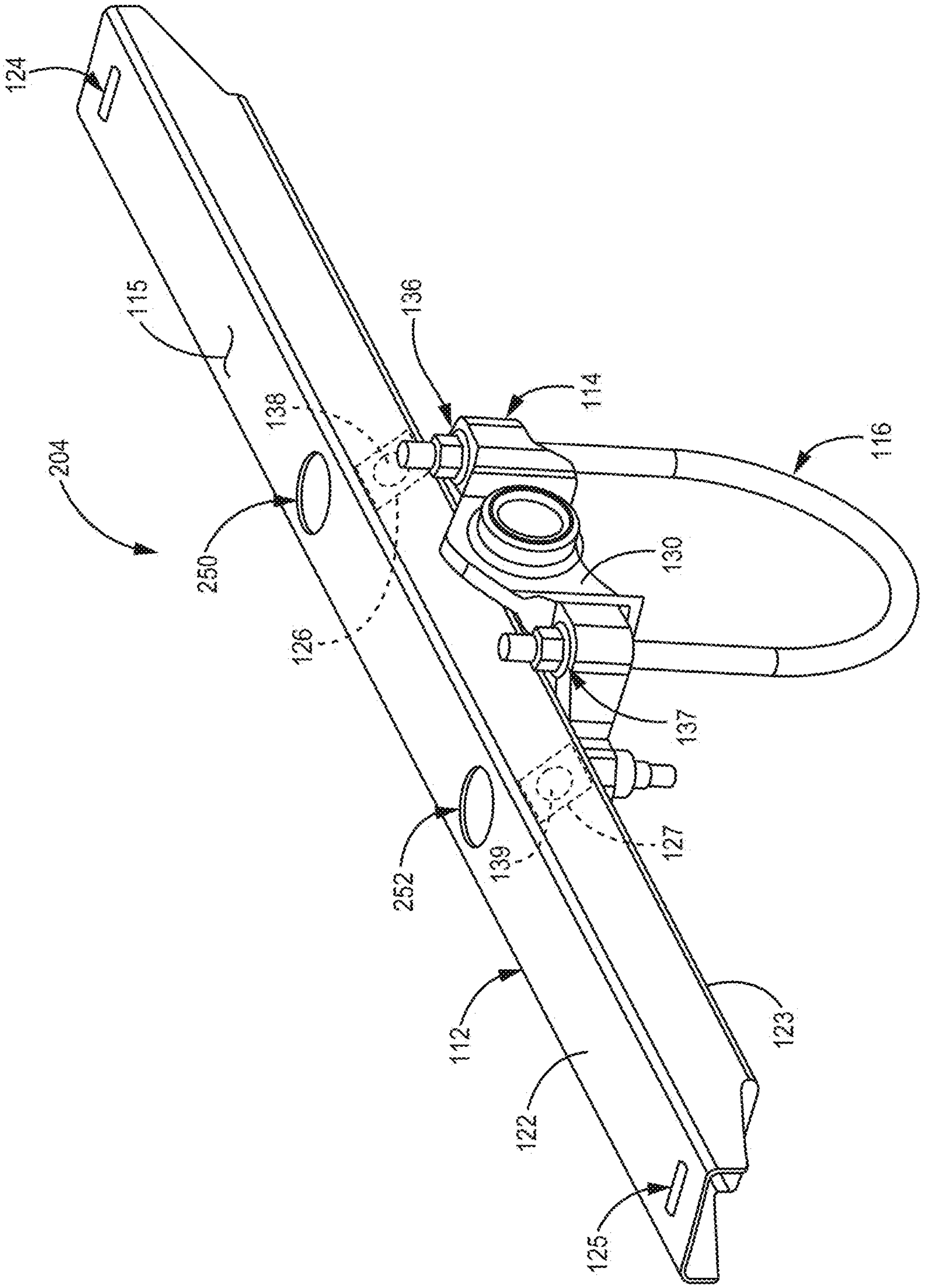
FIG. 6 is a perspective view of another embodiment of a mounting assembly that can be used in the solar module tracking apparatus of FIG. 1.

FIG. 6 illustrates a perspective view of another embodiment of a mounting assembly 204 that can be used in the solar module tracking apparatus 100. The mounting assembly 204 can be similar to, or the same as, the mounting assembly 104 disclosed and illustrated elsewhere in this disclosure except as otherwise noted here and illustrated at FIG. 6.

The mounting assembly 204 can include a first access aperture 250 at the rail 112 and a second access aperture 252 at the rail 112. The first and second access apertures 250, 252 can be configured to allow for manual access to the interior of the rail 112, for instance, access to the interface between the rail 112 at the saddle 114. In particular, the first and second access apertures 250, 252 can be configured to allow for fastening member insertion and installation from the first side (e.g., top side) 122 of the rail 112. As such, the first access aperture 250 can be axially aligned with the first saddle mounting aperture 126 at the rail 112 and the first mounting aperture 138 at the first saddle arm 132, and, accordingly, a fastening member can be placed through the first access aperture 250 through the side 122 of the rail 112 and such fastening member can then be inserted through the first saddle mounting aperture 126 and the first mounting aperture 138. Likewise, the second access aperture 252 can be axially aligned with the second saddle mounting aperture 127 at the rail 112 and the second mounting aperture 139 at the second saddle arm 134, and, accordingly, a fastening member can be placed through the second access aperture 252 through the side 122 of the rail 112 and such fastening member can then be inserted through the second saddle mounting aperture 127 and the second mounting aperture 139.

Figure 7:
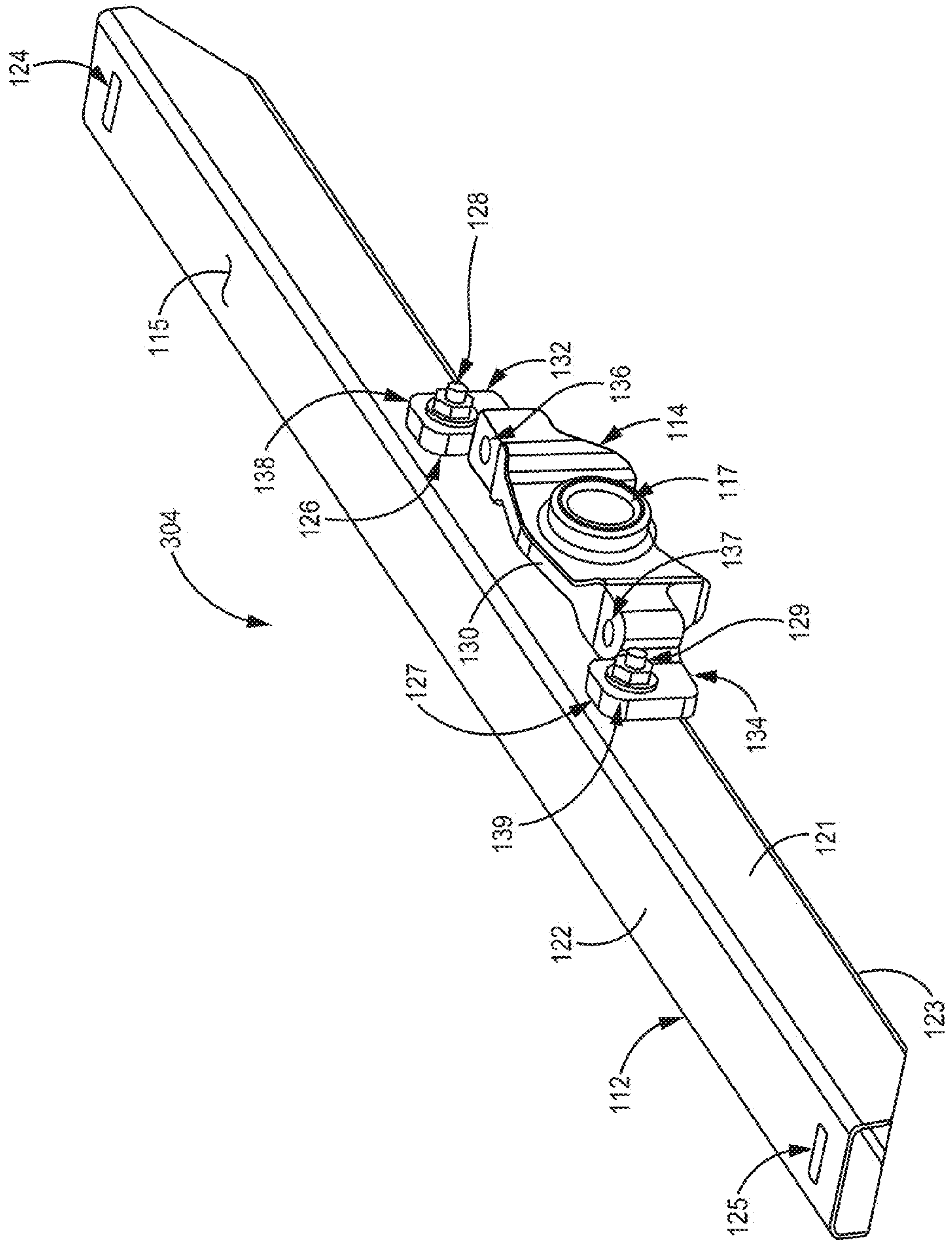
FIG. 7 is a perspective view of an additional embodiment of a mounting assembly that can be used in the solar module tracking apparatus of FIG. 1.

FIG. 7 is a perspective view of an additional embodiment of a mounting assembly 304 that can be used in the solar module tracking apparatus 100. The mounting assembly 304 can be similar to, or the same as, the mounting assembly 104 disclosed and illustrated elsewhere in this disclosure except as otherwise noted here and illustrated at FIG. 7.

In particular, whereas the mounting assembly 104 can be configured to facilitate a coupling arrangement via a top/bottom of the rail 112, the mounting assembly 304 can be configured to facilitate a coupling arrangement via a side of the rail 112. As illustrated for the embodiment of the mounting assembly 304 at FIG. 7, like the mounting assembly 104, the first mounting aperture 138 and the first torque tube mounting aperture 136 can be at a first side of the saddle 114 (e.g., a first side of the pin receiving aperture 117), while the second mounting aperture 139 and the second torque tube mounting aperture 137 can be at a second, opposite side of the saddle 114 (e.g., a second, opposite side of the pin receiving aperture 117). However, for the mounting assembly 304 the first mounting aperture 138 and the first torque tube mounting aperture 136 at the saddle 114 can be offset along a height of the saddle 114 at the first side of the saddle 114, and the second mounting aperture 139 and the second torque tube mounting aperture 137 can be offset along the height of the saddle 114 at the second side of the saddle 114. As such, the first and second mounting apertures 138, 139 can be closer to the first side 122 of the rail 112 than the first and second torque tube mounting apertures 136, 137.

To help facilitate the coupling arrangement via a side of the rail 112, the first and second saddle mounting aperture 126, 127 of the rail 112 can be at a transverse side surface 121 of the rail 112. In this way, the rail 112 can have the first and second solar module mounting apertures 124, 125 at the first side 122 (e.g., top side) of the rail 112 and have the first and second saddle mounting aperture 126, 127 at the transverse side surface 121 of the rail 112 such that the first side 122 (e.g., top side) of the rail 112 and the transverse side surface 121 of the rail 112 are adjacent. To couple the saddle 114 to the rail 112 for the mounting assembly 304, a first fastening member 128 can be inserted through the first mounting aperture 138 at the first saddle arm 132 and through the first saddle mounting aperture 126 at the side surface 121 of the rail 112, and the second fastening member 129 can be inserted through the second mounting aperture 139 at the second saddle arm 134 and through the second saddle mounting aperture 127 at the side surface 121 of the rail 112.

Also within the scope of the present disclosure are various embodiments of methods of attaching a solar module to a movable torque tube using a mounting assembly, such as any of the mounting assembly embodiments disclosed herein. As such, these method embodiments can incorporate use of any one or more features disclosed elsewhere herein.

As one such example, a method of attaching a solar module to a movable torque tube can include connecting a saddle to a rail; positioning a u-bolt around at least a portion of a perimeter of the torque tube and connecting the u-bolt to the saddle such that the u-bolt and the saddle together enclose the perimeter of the torque tube; attaching a solar module at (e.g., directly at) a solar module support surface at the rail. In various embodiments, the solar module can be attached at the rail's solar module support surface such that the solar module support surface can span at least 25% of the length of the frame of the solar module, at least 40% of the length of the frame of the solar module, at least 50% of the length of the frame of the solar module, at least 60% of the length of the frame of the solar module, at least 75% of the length of the frame of the solar module, or at least 90% of the length of the frame of the solar module.

Various examples have been described. These and other examples are within the scope of the following claims.

What is claimed is:

1. A mounting assembly for a solar module, the mounting assembly comprising:

a rail including a first side and a second side, the rail further including a first solar module mounting aperture at the first side and a first saddle mounting aperture at the second side; and a saddle including a saddle body and a first saddle arm extending from the saddle body, the first saddle arm including a first mounting aperture, the saddle body including a first torque tube mounting aperture, wherein the first mounting aperture and the first torque tube mounting aperture are offset along a width of the saddle at a first side of the saddle, wherein the first saddle mounting aperture and the first mounting aperture are configured to receive a first fastening member to form, at least in part, a first connection between the rail and the saddle.

2. The mounting assembly of claim 1, wherein the rail further comprises a second solar module mounting aperture at the first side, and a second saddle mounting aperture at the second side, wherein the saddle further comprises a second saddle arm extending from the saddle body where the second saddle arm includes a second mounting aperture, and wherein the second mounting aperture and the second torque tube mounting aperture are offset along the width of the saddle at a second side of the saddle, the second side of the saddle opposite the first side of the saddle.

3. The mounting assembly of claim 2, wherein the first side of the rail is a top side of the rail and the second side of the rail is a bottom side of the rail such that the first side of the rail is opposite the second side of the rail.

4. The mounting assembly of claim 2, wherein the first mounting aperture and the first torque tube mounting aperture are offset along a height of the saddle at the first side of the saddle, and wherein the second mounting aperture and the second torque tube mounting aperture are offset along the height of the saddle at the second side of the saddle.

5. The mounting assembly of claim 4, wherein the first side of the rail is a top side of the rail and the second side of the rail is a transverse side of the rail such that the first side of the rail is adjacent the second side of the rail.

6. The mounting assembly of claim 2, further comprising:

a u-bolt configured to wrap around at least a portion of a torque tube and connect to the first torque tube mounting aperture at the saddle body and the second torque tube mounting aperture at the saddle body.

7. The mounting assembly of claim 6, wherein, when the u-bolt is connected to the saddle, the u-bolt and the saddle form an enclosure around an entire perimeter of the torque tube.

8. The mounting assembly of claim 1, wherein the first side of the rail further includes a solar module support surface.

9. The mounting assembly of claim 8, wherein the solar module support surface is defined between the first solar module mounting aperture and a second solar module mounting aperture at the first side.

10. The mounting assembly of claim 9, wherein the solar module support surface is configured to directly contact and support the solar module along an entire length of the solar module support surface defined between the first solar module mounting aperture and the second solar module mounting aperture.

11. The mounting assembly of claim 10, wherein the entire length of the solar module support surface configured to directly contact and support the solar module, and defined between the first solar module mounting aperture and the second solar module mounting aperture, is between 500 and 1000 mm.

12. The mounting assembly of claim 11, wherein the entire length of the solar module support surface configured to directly contact and support the solar module, and defined between the first solar module mounting aperture and the second solar module mounting aperture, is between 700 and 900 mm.

13. The mounting assembly of claim 12, wherein the entire length of the solar module support surface configured to directly contact and support the solar module, and defined between the first solar module mounting aperture and the second solar module mounting aperture, is between 750 and 850 mm.

14. The mounting assembly of claim 1, further comprising:

a bearing housing assembly adjacent to the rail and the saddle; and a pin extending between the bearing housing assembly and the saddle.

15. The mounting assembly of claim 14, wherein the saddle comprises a pin receiving aperture at the saddle body, and wherein the pin receiving aperture is configured to receive a first end portion of the pin opposite a second end portion of the pin that is at the bearing housing assembly.

16. The mounting assembly of claim 15, wherein the pin receiving aperture is at a central portion of the saddle body between the first side of the saddle and the second side of the saddle.

17. A solar module tracking apparatus comprising:

a solar module comprising a plurality of photovoltaic cells;

a torque tube that is configured to rotatably move the solar module; and a mounting assembly connecting the solar module to the torque tube, the mounting assembly comprising:

a rail including a first side and a second side, the rail further including a first solar module mounting aperture at the first side and a first saddle mounting aperture at the second side, and a saddle including a saddle body and a first saddle arm extending from the saddle body, the first saddle arm including a first mounting aperture, the saddle body including a first torque tube mounting aperture, wherein the first mounting aperture and the first torque tube mounting aperture are offset along a width of the saddle at a first side of the saddle, wherein the first saddle mounting aperture and the first mounting aperture receive a first fastening member to form, at least in part, a first connection between the rail and the saddle.

18. The apparatus of claim 17, further comprising:

a u-bolt wrapping around at least a portion of the torque tube such that the u-bolt and the saddle form an enclosure around an entire perimeter of the torque tube.

19. The apparatus of claim 18, wherein the first side of the rail further includes a solar module support surface, wherein the solar module support surface is defined between the first solar module mounting aperture and a second solar module mounting aperture at the first side of the rail, wherein the solar module support surface is configured to directly contact and support the solar module along an entire length of the solar module support surface defined between the first solar module mounting aperture and the second solar module mounting aperture, and wherein the entire length of the solar module support surface configured to directly contact and support the solar module, and defined between the first solar module mounting aperture and the second solar module mounting aperture, is between 100 and 3000 mm.

* * * * *